United States Patent [19]

George

[11] 4,277,117
[45] Jul. 7, 1981

[54] INTERNALLY REINFORCED BALL BEARING SPACER

[75] Inventor: Richard F. George, Muskegon, Mich.

[73] Assignee: Keene Corporation, New York, N.Y.

[21] Appl. No.: 66,646

[22] Filed: Aug. 15, 1979

[51] Int. Cl.³ .............................................. F16C 33/38
[52] U.S. Cl. ..................................... 308/199; 308/201
[58] Field of Search .............. 29/148.4 C; 308/189 R, 308/199, 201, 217

[56] References Cited

U.S. PATENT DOCUMENTS

| | | | |
|---|---|---|---|
| 2,893,792 | 7/1959 | Wikoff et al. | 308/199 |
| 2,897,021 | 7/1959 | Zeilman | 308/199 |
| 3,220,785 | 11/1965 | Noll et al. | 308/199 |
| 3,455,616 | 7/1969 | George et al. | 308/199 |

Primary Examiner—Frederick R. Schmidt
Attorney, Agent, or Firm—Price, Heneveld, Huizenga & Cooper

[57] ABSTRACT

A spacer for interposition between adjacent balls in a ball bearing assembly is provided comprising a thermoplastically molded body having a cylindrical periphery and oppositely disposed ball engaging sides. An internal reinforcement disc formed from a material having a high specific heat is molded into the body. The internal reinforcement disc includes a circumferential flange that provides an initial compressive prestress on the thermoplastically molded body.

11 Claims, 6 Drawing Figures

INTERNALLY REINFORCED BALL BEARING SPACER

BACKGROUND OF THE INVENTION

The invention relates generally to ball bearing assemblies suitable for heavy duty use, for example, in connection with the turntables of cranes, power shovels and the like, and more particularly, to spacers interposed between the balls of such ball bearing assemblies.

Ball bearing assemblies for equipment of the character referred to, encounter eccentric vertical and axial loads which set up high and low load zones in the bearing. Bearing balls are found to alternately crowd and spread apart in these high and low load zones, respectively. Such crowding of the balls under extreme loads creates substantial compressive forces on the balls and any ball spacers interposed therebetween. Ball spacers or separators are necessary in these bearings to prevent oppositely moving surfaces of adjacent balls from coming into contact with each other since the rubbing velocity of the ball surfaces is twice that of the velocity of the ball race. Also, rubbing pressures between the balls are considerable when the balls crowd together in a heavily loaded section of the ball bearing. When a resiliently deformable low coefficient of friction plastic material such as nylon is employed as a ball spacer, extreme crowding and compressive force causes the spacers to radially crack due to excessive circumferential or hoop stress.

Various forms of reinforced resiliently deformable spacers have been interposed between the balls of a ball bearing assembly to prevent the balls from coming into direct frictional contact. The simplest approach involves making the body of the spacer wider so that the spacer will withstand greater stresses. However, this approach reduces the load or capacity of the bearing assembly since fewer rolling elements may be interposed in a bearing assembly of a given diameter when such spacers are present. This penalty in capacity becomes important as safety factors are reduced and users of the bearings become size conscious in an evermore competitive industry.

Another approach involves the use of a spacer formed from a resilient deformable plastic body portion having a surrounding metal band. Generally, these banded spacers have body portions that are thermoplastically molded into the circumferential band. This construction allows the molded body portions to shrink away from the reinforcing metal bands upon cooling to ambient temperatures after the molding operation. Thus, such spacers derive little or no benefit from the strength of the bands.

In another type of banded spacer, a ball bearing spacer is provided with a resiliently deformable body portion having a circumferential band press fitted on the cylindrical periphery of the spacer whereby the body portion is subjected to an initial compressive prestress and the band is subjected to an initial tensile prestress. By prestressing or preloading the components of the spacer, the body portion thereof is materially increased in strength and rupture or cracking thereof due to excessive hoop stress is substantially eliminated. Because of the increased strength of this type of spacer construction, the thickness of the spacer can be substantially reduced over that of unreinforced spacer constructions. However, the tolerances between the cylindrical body portion and the surrounding band are critical and the cylindrical spacer must be precision ground to a specific size before being press fit into the band to create the desirable initial compressive prestress. This operation, of course, involves a substantial amount of labor and expense.

In another type of ball bearing spacer, a reinforcing metal band or spring-like structure is embedded in a generally cylindrical molded body portion. However, in this spacer construction, no attempt is made to create an initial compressive prestress on the cylindrical body portion of the spacer. This is clear, especially in the case where a serpentine or spring-like internal reinforcement member is employed, since such an open-ended structure could not support an initial prestress.

SUMMARY OF THE INVENTION

The present invention solves these and other problems in the prior art by provision of a spacer for interposition between adjacent balls in a ball bearing assembly comprising a thermoplastically molded body formed from a resiliently deformable thermoplastic material, the body having a cylindrical periphery and oppositely disposed ball engaging sides. The spacer includes an internal reinforcement disc formed from a material having a high specific heat. The internal reinforcement disc is embedded and centered in the thermoplastically molded body. A circumferential flange is formed on the reinforcement disc, the circumferential flange extending beneath the cylindrical periphery of the body. After the molding process, the body cools much more rapidly than the internal reinforcement disc so that when the reinforcement disc finally cools, the circumferential flange provides an initial compressive prestress on the generally cylindrical body. This initial compressive prestress is created by a combination of factors which include the high specific heat of the internal reinforcement disc, the thermal insulating properties of the thermoplastically molded body and the fact that the internal reinforcement disc is centered within the insulating thermoplastically molded body. These factors combine to insure that the thermoplastically molded body substantially cools and sets before the internal reinforcement disc so that when the internal reinforcement disc cools and contracts, it creates the desired initial compressive prestress.

DESCRIPTION OF THE PREFERRED EMBODIMENTS

Figure 1:
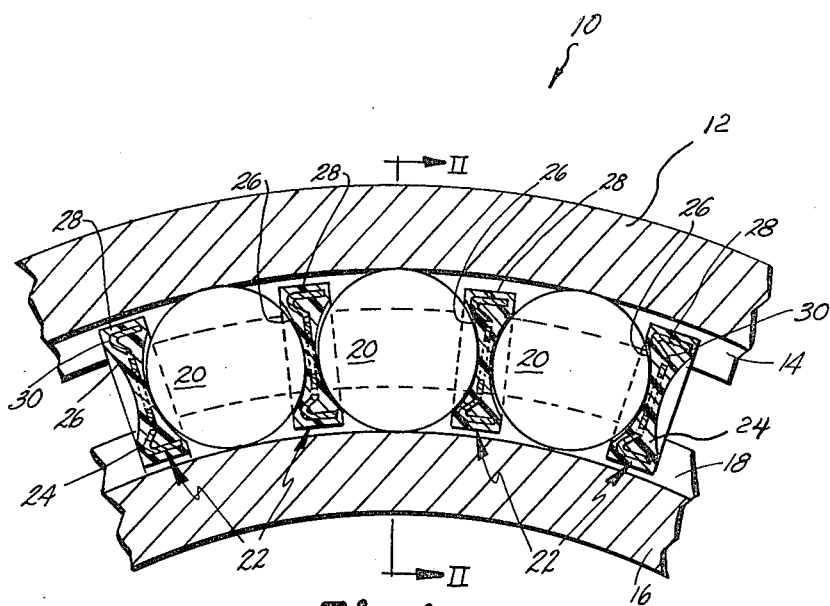
FIG. 1 is a median sectional view of a portion of a ball bearing assembly incorporating the principles of the present invention.
Figure 2:
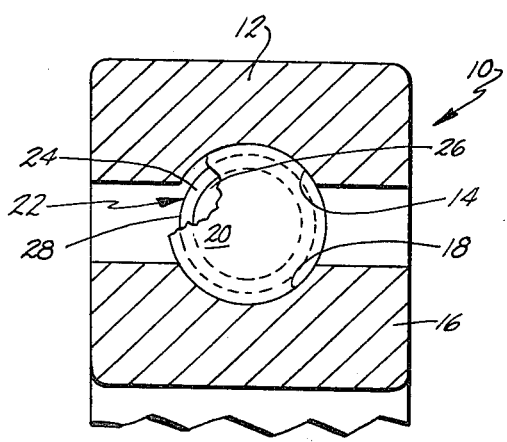
FIG. 2 is a sectional view of the bearing assembly of FIG. 1 taken substantially along the line II—II in FIG. 1.
Figure 3:
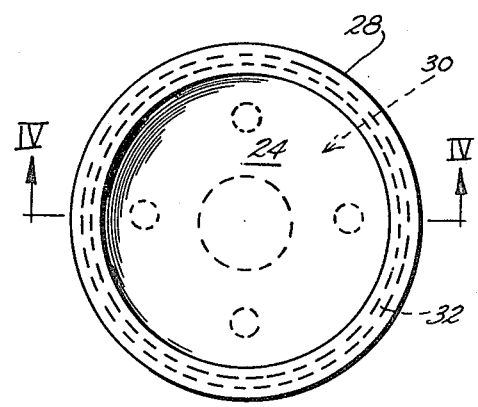
FIG. 3 is a plan view of a ball bearing spacer constructed according to the present invention.
Figure 4:
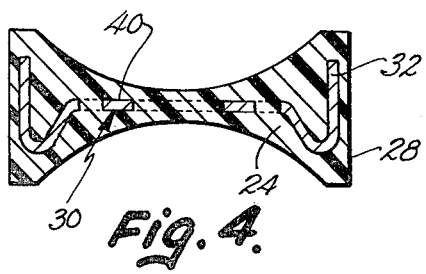
FIG. 4 is a sectional view of the ball bearing spacer of FIG. 3 taken substantially along line IV—IV of FIG. 3.
Figure 6:
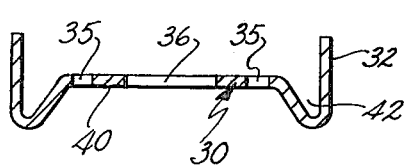
FIG. 6 is a sectional view of the internal reinforcement disc of FIG. 5 taken substantially along the line VI—VI of FIG. 5.
Figure 5:
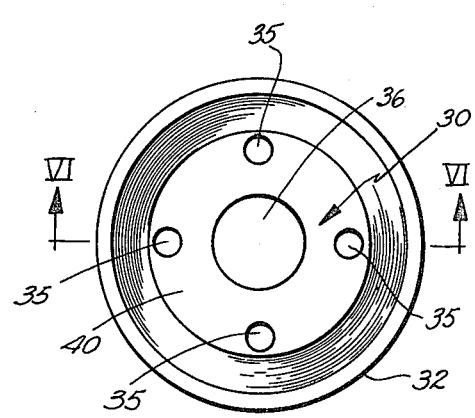
FIG. 5 is a plan view of an internal reinforcement disc of the present invention.

Referring now to FIGS. 1 and 2, there is indicated generally by the reference numeral 10 a ball bearing assembly incorporating the principles of the present invention. The assembly 10 comprises an outer ring 12 having an annular concave groove or bearing race 14, an inner ring 16 having an annular concave groove or bearing race 18, and a plurality of spherical antifriction elements or balls 20 received in and guided by the races 14 and 18.

Interposed between each pair of adjacent balls 20, a spacer 22 is disposed. Each spacer 22 is comprised of a generally cylindrical body portion 24 having a pair of oppositely directed concave spherical ball engaging seats 26 formed in the sides thereof. The radius of curvature of each seat 26 is greater than the radius of curvature of the balls 20. This provides a clearance which permits the balls to carry lubricant to the areas of contact between the balls and the spacers as the balls rotate. The body portion 24 is fabricated of a resiliently deformable material such as a molded nylon. For example, Zytel 7010-33 NC10, type 6-6 nylon or the equivalent with a short glass fiber content of 33% completely disbursed through the molding with no visible accumulation has been found suitable for use with the present invention. The body 24 is preferably thermoplastically molded with a cylindrical periphery 28.

Referring now also to FIGS. 3 through 6, according to the present invention, an internal reinforcement disc 30 is embedded and centered within the thermoplastically molded body 24. Preferably, the internal reinforcement disc 30 is formed from a material having a high tensile strength and high specific heat such as low carbon steel. The internal reinforcement disc 30 includes a circumferential flange 32 formed on the reinforcement disc. The circumferential flange 32 extends beneath the cylindrical periphery 28 of the body 24. Since, the thermoplastically molded body 24 is a good insulator with a relatively low specific heat as compared to the disc 30 and the internal reinforcement disc 30 is centered within the thermoplastically molded body 24, the thermoplastically molded body 24 cools and sets much more rapidly than the reinforcement disc 30 after the molding operation. Typically, nylon is molded at temperatures over 500° F. in a die or mold that is water cooled to increase the rate of speed of the molding operation. In such a molding operation the nylon body cools and sets before substantial cooling of the internal reinforcement disc occurs. Thus, when the internal reinforcement disc later cools and contracts, the circumferential flange 32 creates an initial compressive prestress on the thermoplastically molded body 24 which substantially increases its resistance to radial cracking due to excessive circumferential or hoop stress.

The internal reinforcement disc 30 further includes means for centering the reinforcement disc in a mold cavity comprising a circular array of apertures 35 for receiving a plurality of locator pins. The reinforcement disc 30 includes a central opening 36 to insure that only resiliently deformable nylon extends between opposing surfaces of the balls of the ball bearing assembly to provide a desirable cushioning effect between adjacent balls. Preferably, the reinforcement disc 30 is formed from flat sheet metal stock by a stamping process or a progressive drawing process. The disc is formed with a generally flat central portion 40 surrounded by a circumferential groove 42. The circumferential groove 42 is disposed between the central portion 40 and the circumferential flange 32 and interconnects the same. The circumferential groove 42 strengthens the disc 30, strengthens the hold that the disc 30 has on the body 24, and centers the circumferential flange 32 with respect to the flat central portion 40 and the cylindrical exterior surface 28 of the body 24.

When the bearing assembly 10 is subjected to heavy loads, the balls 20 tend to crowd evermore closely together as they enter the zone or zones of heaviest loading. Conversely, the balls 20 tend to spread further apart as they leave the zone or zones of heaviest loading. While the alternative crowding and spreading of the balls 20 would be impeded by rigid spacers with a resultant increase in friction, such variation in circumferential spacing between the balls is accommodated in the bearing assembly of the present invention by the elasticity of the body portion 24 thereby minimizing friction. Also, due to the elasticity of the body portion 24, the area of contact between the spacer 22 and the adjacent balls 20 increases as the loading increases, thereby permitting greater allowable contact loads. To minimize the interference between the spacers 22 and the races 16 and 18 during relative movement therebetween, the spacers are formed with an outside diameter that is less than the diameter of the balls 20.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. A spacer for interposition between adjacent balls in a ball bearing assembly having a plurality of spherical balls comprising:
   a thermoplastically molded body formed from a resiliently deformable thermoplastic material, said body having a cylindrical periphery and oppositely disposed ball-engaging sides;
   an internal reinforcement disc formed from sheet metal stock, said reinforcement disc being embedded and centered in said thermoplastically molded body;
   a generally flat central portion roughly centered on said disc;
   a circumferential flange formed on said reinforcement disc, said circumferential flange being disposed about the periphery of said generally flat central portion of said disc, said circumferential flange being embedded in said body and extending beneath said cylindrical periphery of said body;
   whereby said body cools more rapidly than said reinforcement disc after the thermoplastic molding of said body and said reinforcement disc thereby provides a compressive prestress on said body.

2. The spacer of claim 1 further including means for centering said reinforcement disc in a mold cavity comprising a circular array of apertures for receiving a plurality of locator pins.

3. The spacer of claim 1 wherein said reinforcement disc includes a central opening to insure that said body provides sufficient cushioning between adjacent balls.

4. The spacer of claim 1 further including a circumferential groove disposed on said disc said circumferential groove being disposed between said central portion and said flange.

5. The spacer of claim 4 wherein said disc and said flange are formed from low carbon steel and said body is molded from Nylon reinforced with short glass fibers.

6. A ball bearing assembly comprising:
   a toroidal raceway;
   a plurality of ball bearings disposed in said raceway; and
   a plurality of resilient spacers, one of said spacers being disposed between each pair of adjacent balls;
   each of said spacers comprising a thermoplastically molded body formed from a resiliently deformable thermoplastic material, each of said bodies having a cylindrical periphery and oppositely disposed ball-engaging sides;
   each of said spacers further including an internal reinforcement disc formed from sheet metal stock, said reinforcement discs being embedded and centered in said thermoplastically molded bodies;
   each reinforcement disc further including a generally flat central portion roughly centered on said disc;
   each reinforcement disc further including a circumferential flange, said circumferential flanges being disposed about the periphery of said generally flat central portions of said discs, said circumferential flanges being embedded in said bodies and extending beneath said cylindrical peripheries of said bodies;
   whereby said bodies cool more rapidly than said reinforcement discs after the thermoplastic molding of said bodies and said reinforcement discs thereby provide a compressive prestress on each of said bodies.

7. The ball bearing assembly of claim 6 further including means for centering said reinforcement discs in a mold cavity comprising a circular array of apertures for receiving a plurality of locator pins.

8. The ball bearing assembly of claim 6 wherein each of said reinforcement discs includes a central opening to insure that said bodies provide sufficient cushioning between adjacent balls.

9. The ball bearing assembly of claim 6 further including a circumferential groove disposed on each of said discs said circumferential grooves being disposed between said central portions and said flanges.

10. The ball bearing assembly of claim 9 wherein said discs and said flanges are formed from low carbon steel and said bodies are molded from Nylon reinforced with short glass fibers.

11. A spacer for interposition between adjacent balls in a ball bearing assembly having a plurality of spherical balls comprising:
   a thermoplastically molded body formed from a resiliently deformable thermoplastic material, said body having a cylindrical periphery and oppositely disposed ballengaging sides;
   an internal reinforcement disc formed from a material having a high specific heat, said reinforcement disc being embedded and centered in said thermoplastically molded body;
   a circumferential flange formed on said reinforcement disc, said circumferential flange extending beneath said cylindrical periphery of said body;
   said disc and said flange being drawn from flat sheet metal stock, said disc having a generally flat central portion surrounded by a circumferential groove, said circumferential groove being disposed between said central portion and said flange; and
   a central opening disposed in said reinforcement disc to insure that said body provides sufficient cushioning between adjacent balls;
   whereby said body cools more rapidly than said reinforcement disc after the thermoplastic molding of said body and said reinforcement disc thereby provides a compressive prestress on said body.

* * * * *